United States Patent [19]

Asberg

[11] 3,749,416
[45] July 31, 1973

[54] WHEEL SUPPORT FOR AN ENGINE PROPELLED ROAD VEHICLE

[75] Inventor: Sture Lennart Asberg, Savedalen, Sweden

[73] Assignee: SKF Industrial Trading and Developing Company N.V., Amsterdam, Netherlands

[22] Filed: Feb. 3, 1971

[21] Appl. No.: 112,286

[30] Foreign Application Priority Data
Feb. 2, 1970  Netherlands.................. 7001649

[52] U.S. Cl.............. 280/96.1, 188/18 A, 301/6 E, 308/191
[51] Int. Cl............................................ B62d 7/06
[58] Field of Search........................ 301/5, 5.7, 126; 280/96.3, 96.1; 308/191; 188/18 A

[56] References Cited
UNITED STATES PATENTS

| 3,295,626 | 1/1967 | Cadiou.......................... 280/96.3 X |
| 3,552,813 | 1/1971 | Brescia, Jr. et al................ 308/191 |
| 3,563,564 | 2/1971 | Bartkowiak....................... 280/96.1 |
| 1,982,377 | 11/1934 | Duby............................. 301/5 R X |
| 2,987,322 | 6/1961 | Hutchens......................... 280/96.3 |
| 1,975,661 | 10/1934 | Powell............................. 301/5.7 X |
| 1,062,472 | 5/1913 | Kaye................................ 280/96.3 |
| 3,332,518 | 7/1967 | North et al. ...................... 188/18 A |
| 3,145,799 | 8/1964 | Wier et al. ..................... 280/96.3 X |

FOREIGN PATENTS OR APPLICATIONS

| 6,805,108 | 10/1969 | Netherlands |
| 6,805,109 | 10/1969 | Netherlands |

Primary Examiner—Kenneth H. Betts
Assistant Examiner—John P. Silverstrim
Attorney—Howson & Howson

[57] ABSTRACT

A preassembled wheel support unit having inner and outer annular members with confronting raceways for relative rotation and means for connecting one annular member to the vehicle and the other annular member to the wheel and brake disk. The pitch diameter of the raceways is at least twice the overall axial width of the annular members whereby forces resulting from functioning of the brake are acting at substantially the same diameter and close to forces from the wheel and reaction forces from the vehicle.

3 Claims, 6 Drawing Figures

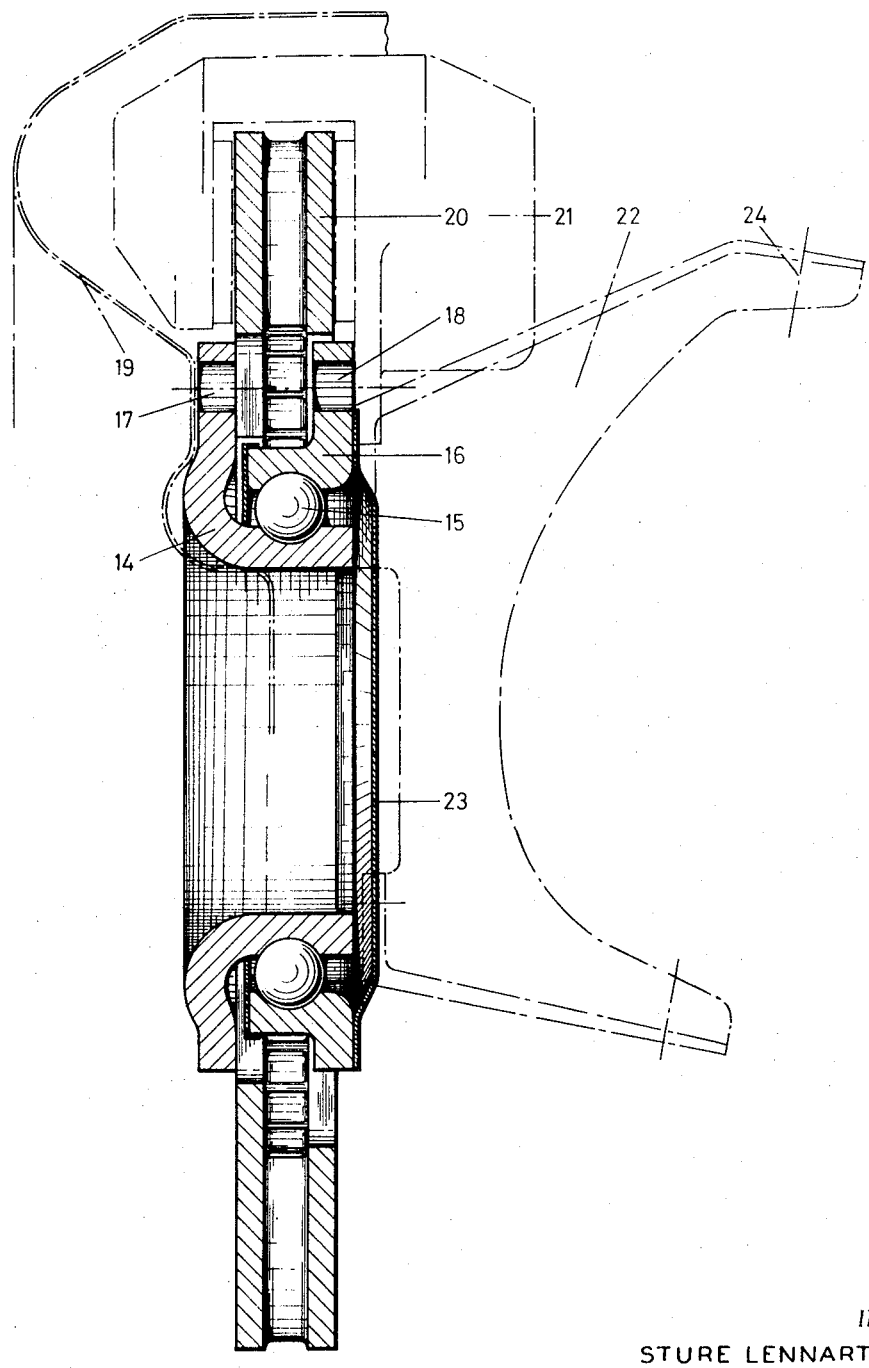

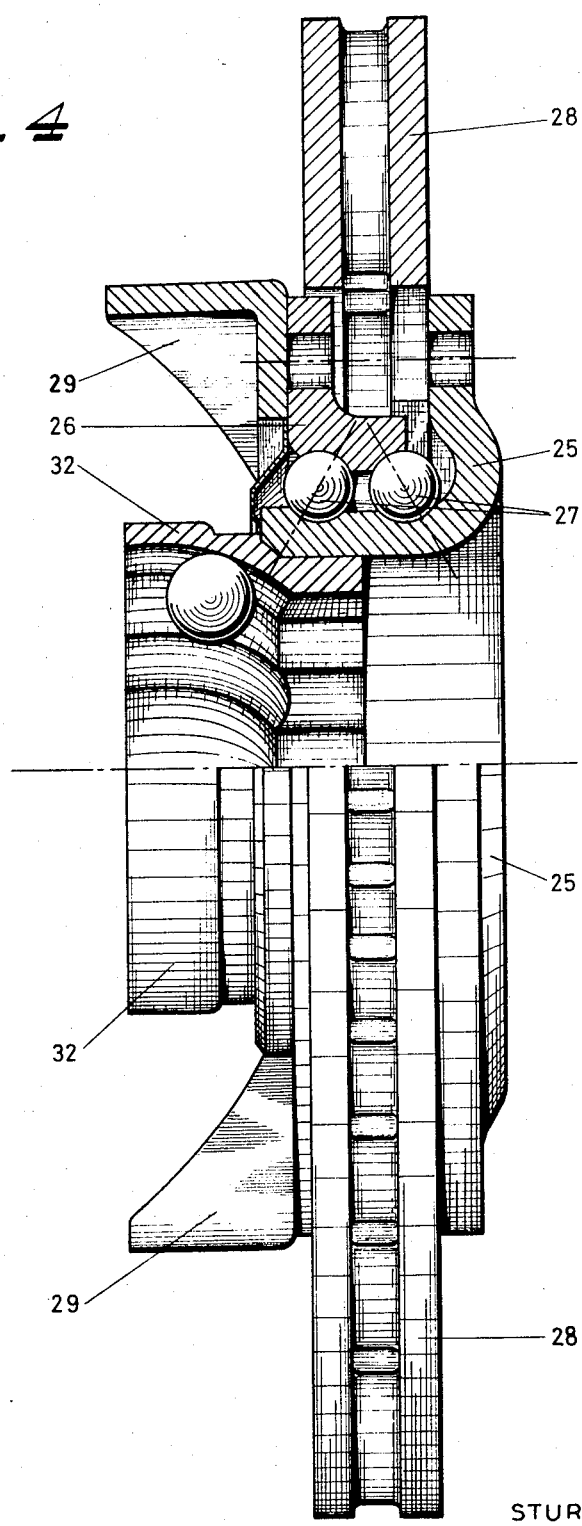

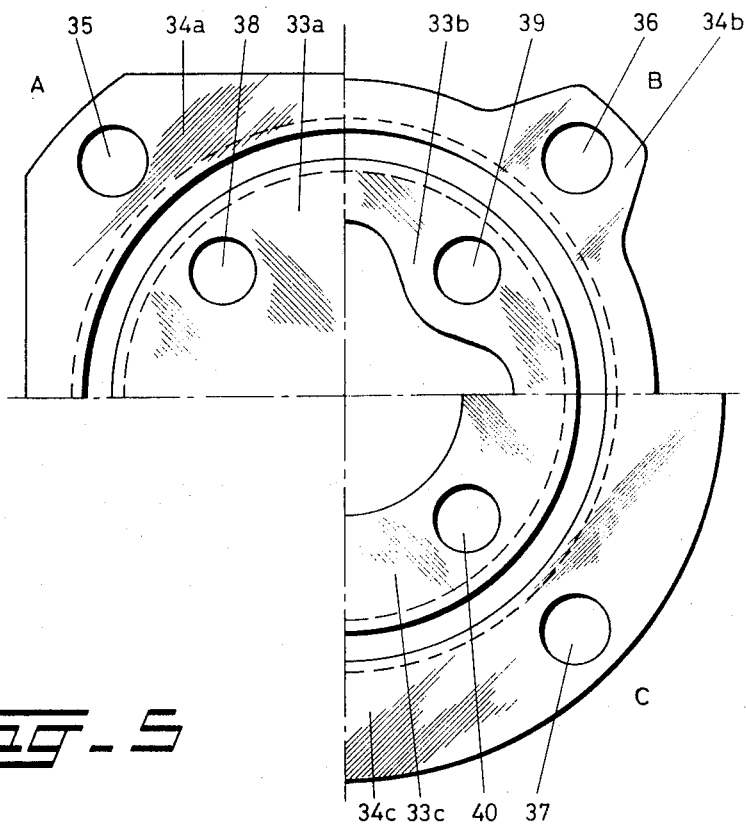
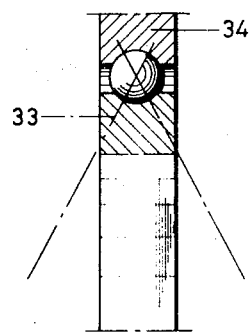

WHEEL SUPPORT FOR AN ENGINE PROPELLED ROAD VEHICLE

The present invention relates to a wheel support for a disc braked wheel of an engine propelled road vehicle having at least three wheels of which at least one can be driven, said wheel support being a preassembled unit comprising two concentric structural members rotatable with respect to each other by axially and radially supporting rolling elements between said members and engaging uninterrupted races carried by said members, each structural member having integral means for detachably connecting the unit to the vehicle on one hand and to the wheel and brake disc on the other hand, characterized in that the pitch diameter of the rolling bearing elements is considerably larger than the pitch diameter required for a rolling bearing mounted on a shaft or a hub in order to achieve sufficient bearing capacity and is at any rate larger than the axial width of the unit counted between the planes perpendicular to the axis and defining the outermost confines of the two structural members.

Wheel supports of this kind are known from for instance the published Dutch Pat. application Nos. 68.05108 and 68.05109, in which it already has been disclosed to make a wheel support in the form of a unit to simplify manufacturing costs and to simplify mounting and dismounting, which is of importance during manufacturing and in case of repair.

In said older proposals the traditional way of designing the wheel supports had not been entirely left. According to the traditional way of designing separate ball or roller bearings were used, having their own inner and outer race ring located upon and within precisely machined seats upon an axle and within a bearing housing respectively. This required a great number of surfaces which had to be machined with high accuracy by means of which one, however, could not avoid the problems resulting from accumulating tolerances. To reduce costs and to be able to take up transverse loads on the wheel and to transfer said loads towards the support it has been the normal design to use axially spaced bearings of small diameter.

With the above mentioned older proposals a new manner of design has been indicated, since due to the use of integral race surfaces manufacturing costs could be reduced and the problem of accumulating tolerances solved, whilst the unit obtained according to said older proposals constitutes a considerable simplification of mounting and repair operations.

The design has, however, still been traditional in respect to the axial and radial dimensions of the bearing and in this respect the present invention now suggests an untraditional teaching, according to which the bearing has to be as large as possible in the radial direction and as small as possible in the axial direction. According to the invention this is achieved in that the pitch diameter of the rolling bearing elements is characterized in that the pitch diameter of the rolling bearing elements is considerably larger than the pitch diameter required for a rolling bearing mounted on a shaft or a hub in order to achieve sufficient bearing capacity and is at any rate larger than the axial width of the unit counted between the planes perpendicular to the axis and defining the outermost confines of the two structural members.

In most cases the pitch diameter will even be larger than the overall axial length or width of the unit including drive coupling means. By giving the bearing unit such a large diameter the bearing elements are located as close as possible to the areas of the incoming forces from the wheel and brake disc, so that the radial length of flexible material between the bearing on one hand and the wheel and brake disc on the other hand has been reduced to a minimum. The same holds true for the stationary part of the unit which as a consequence has a larger radial distance from the axis of the wheel support, which acts in improving rigidity of all members, connecting the wheel support with the body of the vehicle. As a consequence the weights of several parts can be reduced.

Preferably according to the invention the pitch diameter of the bearing elements has a diameter, which in relation to the wheel rim and a radially outermost location of the calliper housing of the brake and correspondingly largest diameter of the brake disc, is as large as possible so that the annular space between the inner diameter of the active surface of the brake disc and the bearing elements is substantially filled by the outer structural member and the integral connecting means of the unit. Accordingly the bearing has the largest diameter possible within the limits of the constructional design. Rim diameter and width limit the outer diameter of the brake disc. The advantages of a large diameter of the brake disc are known. Now according to the invention the bearing diameter approaches the brake disc as close as possible to the forces which can operate upon the wheel support. Preferably the pitch diameter will be twice the width of the unit.

This teaching has as a further consequence that it becomes possible to use a large diameter one row ball having two point contact in each race.

It is observed in this respect that from French Pat. specification No. 949,443 a construction is known for a driven front wheel of a motor vehicle, having in the centre of the wheel support a homokinetic drive coupling of the RZEPPA type and a double row ball bearing in the same plane which bearing due to the presence of said coupling has a relatively large diameter. This known construction is not a unit and does not have any place for the provision of a brake disc. Further from British Pat. specification No. 932,571 it is known in the same type of wheel support as known from the above mentioned French specification to surround the drive coupling by a bearing assembly of large diameter, composed of a one row roller bearing adapted to take up radial forces and two axially functioning needle bearings. This construction is extremely complicated, does not form a unit and does not allow the provision of a brake disc, whilst further it is completely wrong to use needle bearings in the way suggested.

In the sense of the older proposals according to the above mentioned Dutch patent applications the bearing unit may comprise two structural members each with integral races and with a brake disc attached to the inner rotating one of said members and as the consequence of the large diameter according to the present invention the calliper housing of the brake now can be attached to the other structural member and no longer to some other part of the supporting construction. Due to this the forces coming from the brake act close together which contributes in further strengthening the structure and/or reducing the weight.

In case of a steerable wheel the bearing unit of the wheel support has to be connected to the vehicle through the intermediance of a King Pin body, which itself by guiding arms is pivotally secured to the vehicle.

As a further consequence of the invention said King Pin body can be a sheet metal pressed hollow annular cup-shaped member with diametrically positioned holes in the cup-wall for the King Pin bearing, which for instance may have the form of ball joints. Normally a forged metal part is used for the King Pin body and it will be clear that the hollow pressed metal member is much cheaper to manufacture and lighter in weight.

All this results from the fact that the forces acting on the different parts of the construction are in inverted proportional relationship to the distance to the centre of rotation. Further due to the fact that the force absorbing surfaces increase proportionally with the diameter, the radical increase of the pitch diameter will also radically lower the stresses. The great pitch diameter makes it possible to transfer the forces from the wheel more directly to the vehicle. In many cases the pitch diameter of the bearing will be closely related to the diameter of the wheel bolt circle so that all parts have the same favourable distance from the rotation centre.

Further the great pitch diameter implies that other constructional members, such as brakes, steering and suspension knuckles etc. are at short distance from each other and from the bearing so that all functions can be done more properly since the rolling members rotatably separating but also connecting the stationary and rotatable parts of the wheel support are arranged close to the places of all incoming functions. Accordingly these members can be connected in the most simple and effective way with the wheel support with small portions of material between the race ring carrying structural members and the attaching means of said other members.

Still further the greater pitch diameter tends to increase the bearing capacity, which increases the liberty in constructing the bearing. E.g., the well known excentric filling method can be used without filling slot which is an advantage for safety reasons in a wheel for a motor vehicle. The increased diameter also implies that the dimension of the bearing construction in axial direction can be reduced without reducing the rigidity.

As a further indication concerning the magnitude of the pitch diameter it may be stated that said diameter is substantially twice the diameter of a normal bearing mounted on a shaft for the same vehicle size.

A further consequence is that other materials can be used such as light metal, reinforced synthetic resins, etc.

The invention will now be further elucidated with reference to the drawings.

FIG. 3 shows another embodiment in vertical cross section for a non-driven steerable wheel.

FIG. 4 shows partly in cross section an embodiment of a driven steerable wheel.

FIG. 5 shows as a further embodiment a very simple solution.

FIG. 6a, b and c show different forms of the inner and outer parts of the embodiment of FIG. 5.

Figure 1:
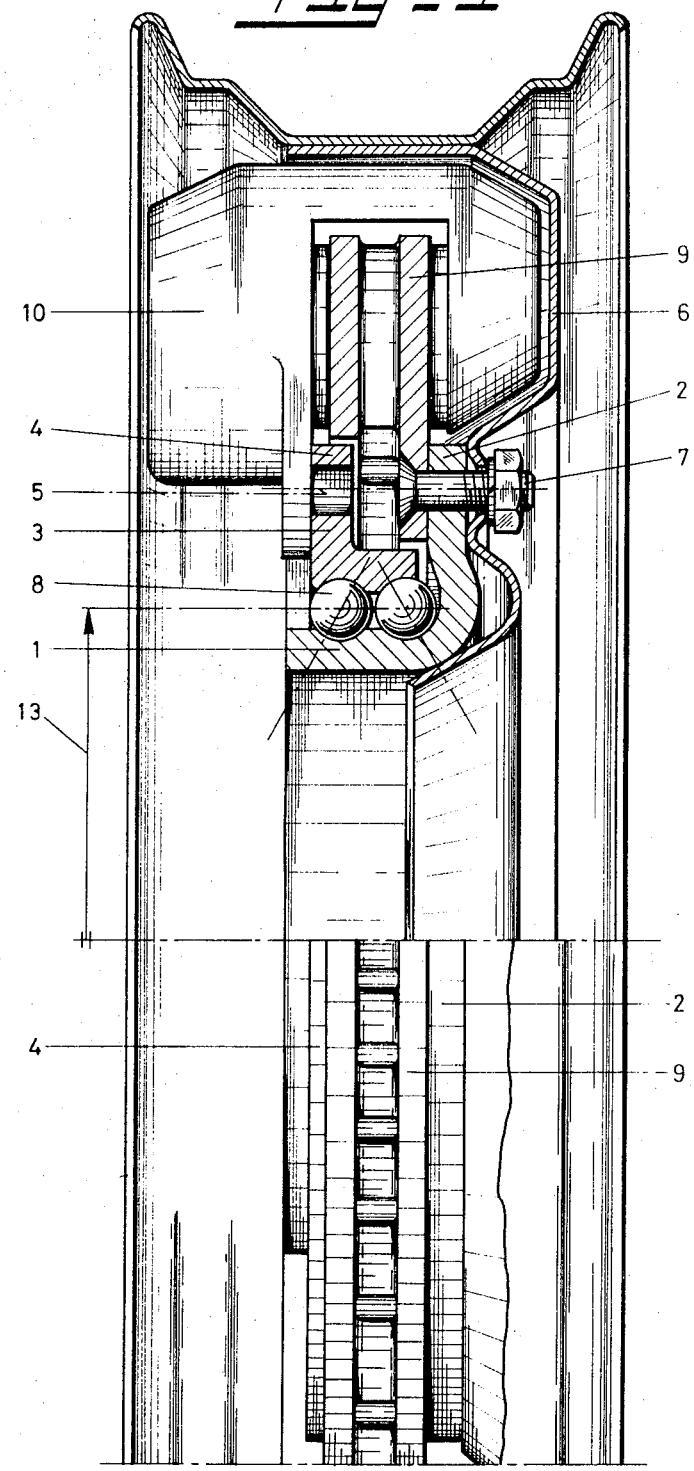
FIG. 1 shows partly in cross section an embodiment of the wheel support for a non-driven wheel.
Figure 2:
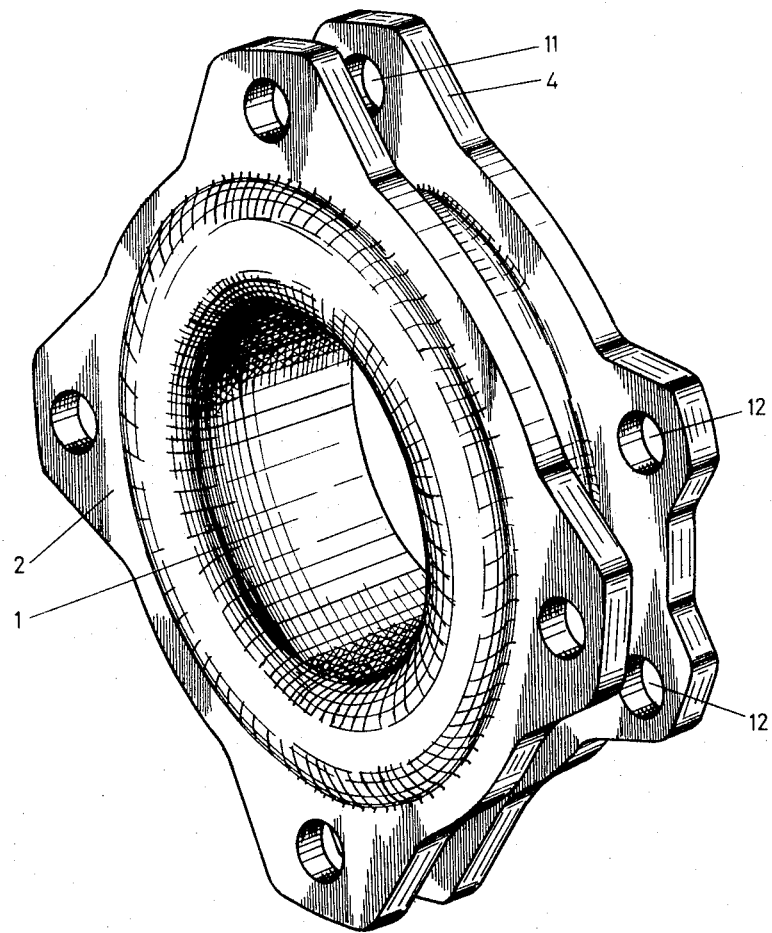
FIG. 2 shows the embodiment of FIG. 1 in perspective.

The wheel support of FIGS. 1 and 2 comprises an inner structural member 1 with a radial flange 2 and an outer structural member 3 with integral flange 4. Both flanges 2 and 4 are provided with bolt holes at the pitch diameter 5 which holes form the integral connecting means.

To the flange 2 of the structural member 1 a wheel 6 and a brake disc 9 are secured by means of bolts 7.

The calliper or brake block housing 10 is secured to the flange 4. According to FIG. 2 the flange 4 has upper and lower holes 11 for the attachment to the vehicle and holes 12 for the attachment of the calliper.

In the embodiment of FIGS. 1 and 2 a two row bi-axial radial ball bearing is used, indicated with the reference 8. Said bearing has a pitch diameter 13 which under the constructional circumstances shown in FIG. 1 is the largest diameter possible.

FIG. 3 shows another embodiment differing primarily from FIGS. 1 and 2 in that the bi-axial radial ball bearing has only one row of balls. In principle this embodiment does not differ much from the one shown in FIG. 1 and 2. It has an inner structural member 14, a ball row 15 and an outer structural member 16. Both members 14 and 16 have radial flanges, provided with holes 17 and 18 for the insertion of bolts by means of which a wheel 19 can be attached to the inner member 14 together with the brake disc 20, whilst the calliper 21 has been secured to the radial flange of the outer structural member 16, the position of the calliper 21 being schematically indicated in view of the fact that its location is not on the plane of the drawing.

This outer structural member further has been secured to a King Pin body 22 which with an annular flange 23 lies against the member 16. The King Pin body 22 is cup-shaped and has bearing provisions for a King Pin of which only the axis 24 has been shown.

FIG. 4 shows the embodiment for a driven wheel. Again the support is formed by an inner structural member 25, an outer structural member 26 and a double row bi-axial radial ball bearing 27. The brake disc 28 is together with the not shown wheel secured to the flange of the inner member 25. Against the flange of the outer member 26 an annular member 29 has been secured for the connection with the vehicle.

Secured to the inner structural member 25 for instance by means of welding is one part 32 of a homokinetic coupling.

FIGS. 5 and 6 show the most simple embodiment of the wheel support according to the invention, said support being made of parts punched out of a flat piece of sheet metal, the inner part 33 and the outer part 34 thereafter being provided with races for one row of balls.

In the same way as in the embodiment of FIG. 3 said balls have two point contact in each race surface.

As follows from FIGS. 6a, b and c said inner and outer parts may have different forms. Thus FIG. 6a shows an outer part 34a, which is substantially square in side elevation and has been provided with bolt holes 35 at the corners.

FIG. 6b shows an embodiment with four diametrically opposed ears 34b with a bolt hole 36.

According to FIG. 6c the outer member 34c is an annular member provided with bolt holes 37.

As far as the inner member is concerned FIG. 6a shows a closed inner part 33a with holes 38, 6b shows an open inner part with inwardly directed ears 33b with bolt holes 39 and FIG. 6c shows an inner annular member 33c with bolt holes 40.

What we claim is:

1. A preassembled support for a disc-braked wheel of an engine propelled road vehicle comprising inner and outer annular members relatively rotatable about a central axis, said annular member having confronting raceways, a plurality of rolling elements in the annular space between said raceways, each of said members having a radially directed flange, first connecting means on the flange of one of said members for detachably connecting the same to the vehicle, second connecting means on the flange of said other member for connecting the same to wheel and brake disc, the pitch diameter of the pitch circle of said rolling elements being at least twice the overall axial width of said annular members, said connecting means being spaced closely to the pitch circle of the rolling elements whereby forces resulting from functioning of the brake are acting at substantially the same diameter and close to forces from the wheel and reaction forces from the vehicle.

2. A preassembled support as claimed in claim 1 including a king pin body disposed between the first connecting means and the vehicle.

3. A preassembled support as claimed in claim 2 wherein said king pin body is a sheet metal pressed hollow annular cup-shaped member with diametrically positioned openings in the cup wall for a king pin bearing.

* * * * *